United States Patent

Kondo et al.

[11] Patent Number: 5,966,183
[45] Date of Patent: Oct. 12, 1999

[54] SIGNAL CONVERTER AND SIGNAL CONVERSION METHOD

[75] Inventors: Tetsujiro Kondo; Yasuhiro Fujimori, both of Kanagawa, Japan

[73] Assignee: Sony Corporation, Tokyo, Japan

[21] Appl. No.: 08/619,182

[22] Filed: Mar. 21, 1996

[30] Foreign Application Priority Data

Mar. 22, 1995 [JP] Japan ................................. 7-088802

[51] Int. Cl.$^6$ .................................................. H04N 5/21
[52] U.S. Cl. .......................... 348/458; 348/409; 348/415; 348/437; 348/438
[58] Field of Search .................................. 348/607, 618, 348/616, 619, 437, 438, 448, 452, 458, 420, 403, 404, 395, 400, 413, 415, 409; 382/239, 243, 248; H04N 5/21

[56] References Cited

U.S. PATENT DOCUMENTS

| | | | |
|---|---|---|---|
| 4,648,119 | 3/1987 | Wingfield et al. | 382/243 |
| 4,684,985 | 8/1987 | Nakagaki et al. | 348/448 |
| 5,010,402 | 4/1991 | Nishibo et al. | 348/401 |
| 5,416,857 | 5/1995 | Chen et al. | 348/401 |
| 5,638,128 | 6/1997 | Hoogenboom et al. | 348/416 |

*Primary Examiner*—John K. Peng
*Assistant Examiner*—Wesner Sajous
*Attorney, Agent, or Firm*—Frommer Lawrence & Haug, LLP.; William S. Frommer

[57] ABSTRACT

The present invention relates to a signal converter and a signal conversion method in which an interpolated image is formed on the basis of suitable classification according to features of an input image signal to obtain a high-definition image signal. In a frequency characteristic determination section, frequency characteristics of an input image signal are classified and evaluated with respect to each of predetermined unit blocks. On the basis of the result of this classification, the desired one of a plurality of pixel patterns is selected with respect to each of the unit blocks of the input image signal, thereby setting a spatial class. In a classification section, the input image signal forming the selected pixel pattern undergoes data compression processing by the number of quantization bits according to the frequency characteristics, thereby forming a spatial class after compression. Interpolated pixels are formed from the input image signal by using prediction coefficients or predicted values based on the spatial class after compression.

34 Claims, 11 Drawing Sheets

FIG. 11

| | CLASSES | | PREDICTION COEFFICIENTS |
|---|---|---|---|
| 0 | 0 | 0.0 | |
| | 1 | 0.1 | |
| | ⋮ | ⋮ | ⋮ |
| 1 | | | |
| | | | ⋮ |
| 2 | | | |
| | | | ⋮ |

CLASS c0   CLASS c1   CLASS d0

SIGNAL CONVERTER AND SIGNAL CONVERSION METHOD

BACKGROUND OF THE INVENTION

1. Field of the Invention

The present invention relates to a signal converter and a signal conversion method. For example, the present invention is suitably applicable to an up-converter for converting a standard definition (SD) signal such as that of the NTSC system into a high definition (HD) signal such as that of the hi-vision system.

2. Description of the Related Art

In an up-converter of this kind, an HD signal is formed from an SD signal by processing the SD signal by frequency interpolation so that the number of pixels is increased. For example, as shown in FIG. 1, an SD signal represented by larger types of symbols "○" and "Δ" on scanning lines 1A is doubly frequency-interpolated in the horizontal and vertical directions to form an HD signal represented by smaller types of symbols "○" and "Δ", thereby forming an HD image 1.

As an example of an interpolation method using an up-converter, a method of forming HD pixels at four positions from field data of an SD signal is known. With respect to an SD pixel represented by a symbol "⊙" in FIG. 1, HD pixels are formed at four kinds of positions, i.e., mode-1 to mode-4 positions, in the vicinity of the SD pixel by interpolation.

As an interpolation filter used for this interpolation, a spatial two-dimensional nonseparable filter 2 shown in FIG. 2 and a horizontal-vertical separable filter 3 shown in FIG. 3 are known.

In the two-dimensional nonseparable filter 2, two-dimensional filter sections 4A to 4D perform interpolation processing independently of each other with respect to HD pixels at mode-1 to mode-4 positions, respectively. The results of interpolation by the two-dimensional filter sections 4A to 4D are combined in series with each other by a selecting section 5 to obtain an HD signal.

The horizontal-vertical separable filter 3 performs processing for modes 1 and 3 by a vertical interpolation filter section 6A and processing for modes 2 and 4 by a vertical interpolation filter section 6B to form data of two HD signal scanning lines. Then the filter 3 interpolates HD pixels at four positions with respect to each scanning line by using horizontal filter sections 7A and 7B and arranges HD pixels in series in a selecting section 8 to form an HD signal.

In the above-described conventional up-converter, the number of pixels is increased but the spatial definition cannot be increased from that defined by an SD signal even if an ideal filter is employed as an interpolation filter. In practice, it is impossible to employ an ideal filter. Therefore, the definition of an HD signal is necessarily lower than that of the SD signal from which the HD signal is formed.

As a solution of such a problem, a classification adaptive processing method has been proposed (in Japanese Patent Laid-Open Publication No. 328185/1993) in which an input SD signal is divided into several classes according to its features and a high-definition HD signal is formed by using prediction coefficients which are prediction data previously formed by learning with respect to the classes.

In the case of forming an HD signal by such a classification adaptive processing method, however, the accuracy of prediction of the HD signal is low if the input signal is not suitably classified according to its features.

Also, if the classification ability at the time of learning is not sufficiently high, it is possible that HD signals, which are to be separated into different classes, are separated into the same class. In such a case, prediction coefficients obtained by learning predict an average value of HD signals differing in characteristics, resulting in a reduction in the ability of restoring the definition of the resulting HD image signal.

SUMMARY OF THE INVENTION

In view of these circumstances, an object of the present invention is to provide a signal converter and a signal conversion method in which a high-definition HD image signal can be formed with high prediction accuracy by suitably classifying and evaluating an input image signal according to features of the same.

To achieve this object, according to the present invention, there is provided a signal converter having: frequency characteristic determination means for evaluating a frequency characteristic of an input image signal with respect to each of predetermined unit blocks; selecting means for setting a spatial class by selecting one of the pixel patterns set with respect to each of the unit blocks of the input image signal according to the corresponding frequency characteristic; classification means for forming a class code by setting the number of quantization bits with respect to the input image signal forming the selected pixel pattern and according to the frequency characteristic and by performing processing for data compression of the input image signal; prediction coefficient storage means for storing, in correspondence with the class code, prediction coefficients for predicting and forming interpolated pixels from pixels of the input image signal; and prediction calculation means for forming a high-definition image signal with respect to the input image signal by performing processing for prediction calculation of the input image signal using the prediction coefficients read out of the prediction coefficient storage means according to the class code.

BRIEF DESCRIPTION OF THE DRAWINGS

FIG. 11 is a diagram showing an example of the content of a prediction coefficient ROM;

DESCRIPTION OF THE PREFERRED EMBODIMENTS

Embodiments of a signal converter and a signal conversion method of the present invention will be described below with reference to the accompanying drawings.

Figure 4:
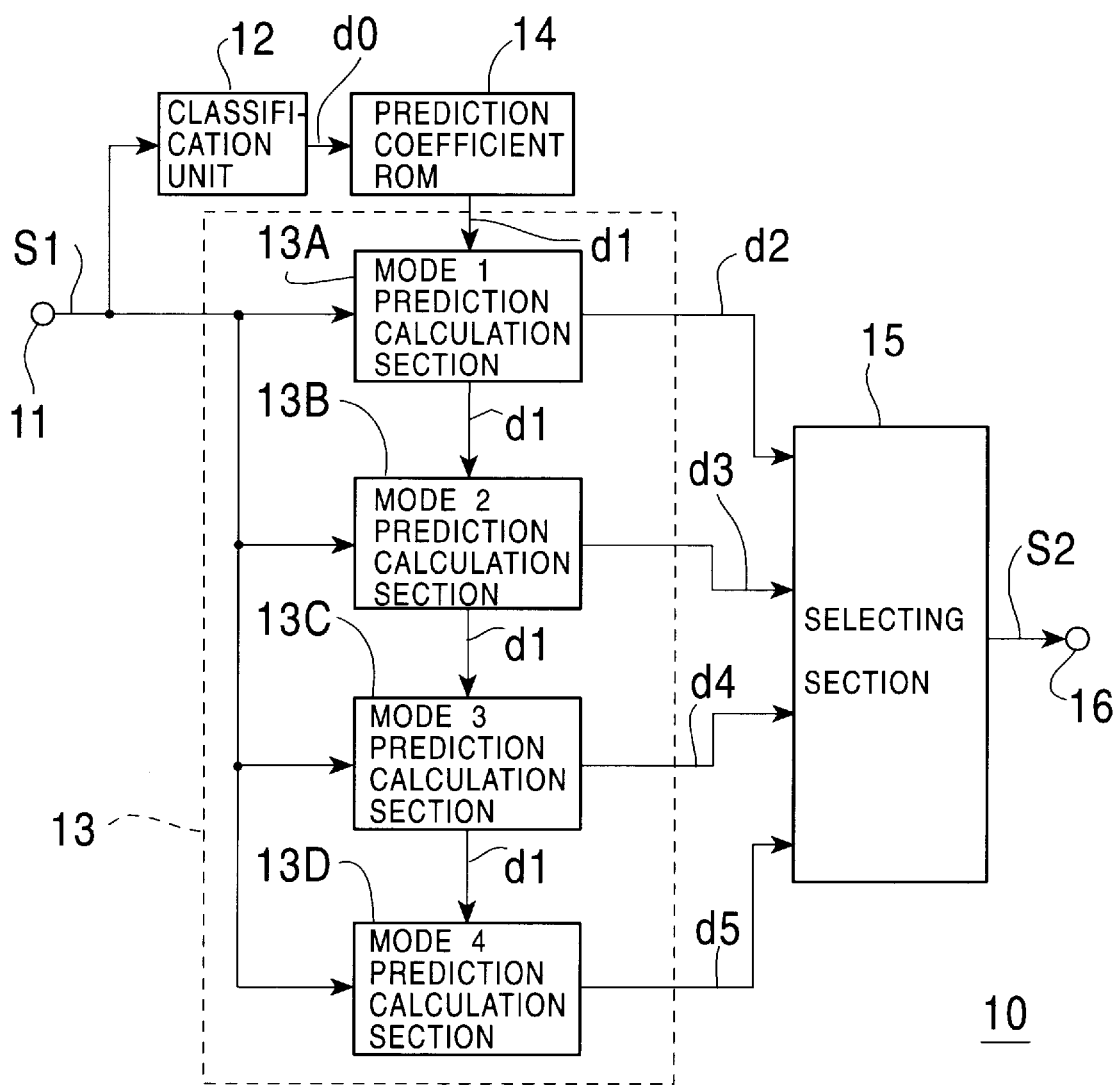
FIG. 4 is a block diagram of an embodiment of a signal converter of the present invention.

FIG. 4 shows the entire configuration of an up-converter 10 to which a classification adaptive processing method is applied and which uses a two-dimensional nonseparable filter for forming an HD image signal from an SD image signal. An SD image signal $S_1$ input to the up-converter through an input terminal 11 is sent to a classification unit 12 and a prediction calculation unit 13 in a parallel manner. In the classification unit 12, class data d0 is formed on the basis of features of SD image signal $S_1$ about an HD image signal newly formed. Class data d0 is sent as address data to a prediction coefficient read only memory (ROM) 14 provided as a storage means.

In the prediction coefficient ROM 14, prediction coefficients which are prediction data d1 previously obtained by learning with respect to classes are stored in correspondence with class data d0. Prediction data d1 is read out of the prediction coefficient ROM 14 with class data d0 used as address data. Prediction data d1 read out is sent to the prediction calculation unit 13, in which predetermined prediction calculation is executed by using prediction data d1 with respect to SD image signal $S_1$ to convert SD image signal $S_1$ into HD image signal $S_2$, which is output through an output terminal 16.

The prediction calculation unit 13 of the up-converter 10 is formed of four prediction calculation sections 13A to 13D in which HD image pixels d2, d3, d4, and d5, which are interpolated pixels corresponding to four kinds of positions on scanning lines, i.e., mode-1 to mode-4 positions, are formed. In each of the calculation sections 13A to 13D, processing for multiplication and addition of SD image signal $S_1$ using prediction data d1 is executed. HD pixels d2 to d5 formed in the prediction calculation sections 13A to 13D are sent to a selecting unit 15. In the selecting unit 15, HD pixels d2 to d5 are rearranged in a desired time series by using a buffer memory (not shown) to form HD image signal $S_2$ output through the output terminal 16.

Figure 5:
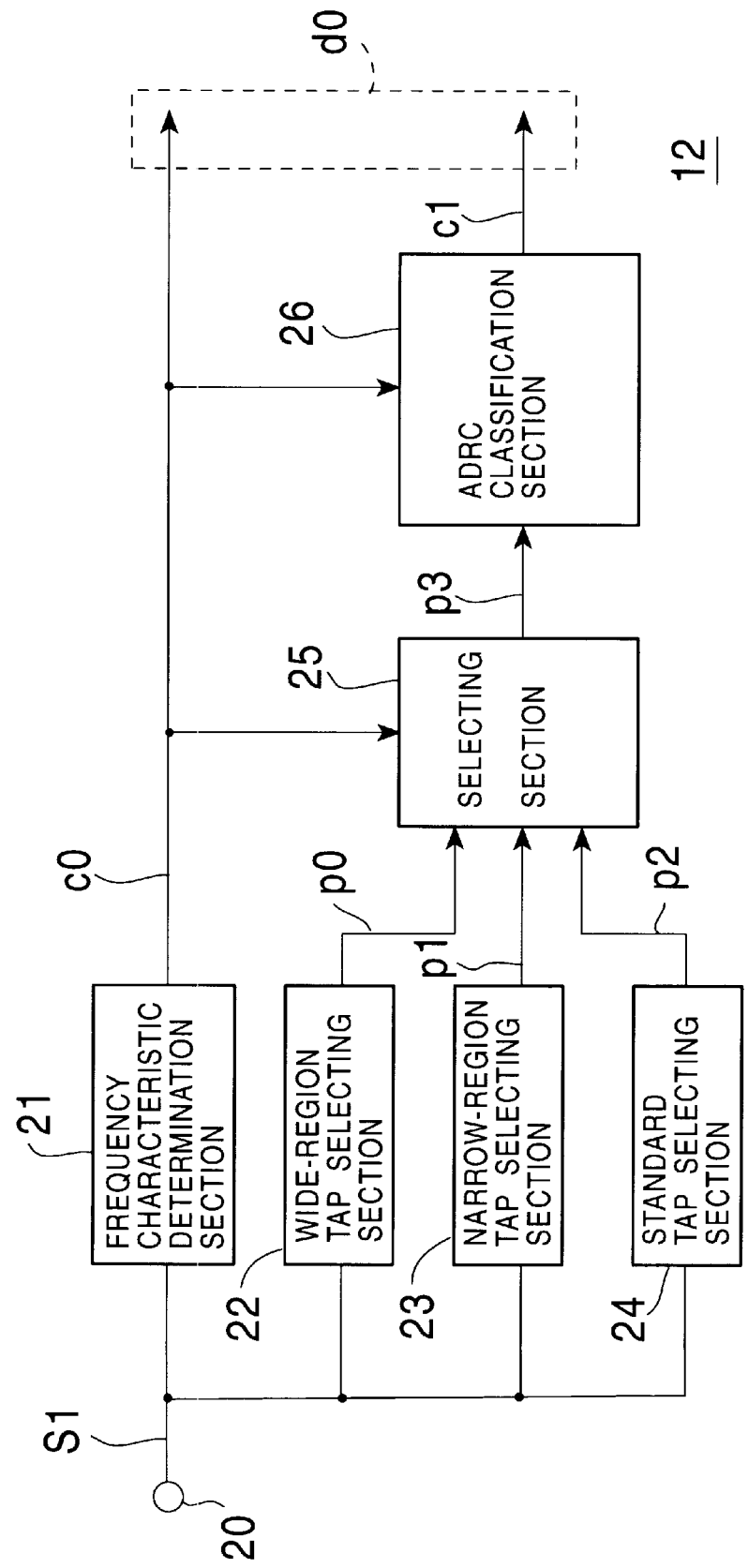
FIG. 5 is a block diagram of an example of a classification unit of the signal converter shown in FIG. 4.

As shown in FIG. 5, in the classification unit 12, a frequency characteristic determination section 21 first determines and evaluates a distribution characteristic of SD image signal $S_1$ input through an input terminal 20 with respect to each of predetermined unit blocks by sorting frequency components of the signal. The classification unit 12 forms frequency-sorted class data c0 on the basis of the result of the determination and evaluation and sends this data to a selecting section 25 and to an adaptive dynamic range coding (ADRC) classification section 26. On the other hand, SD image signal $S_1$ is sent in a parallel manner to a wide-region tap selecting section 22, a narrow-region tap selecting section 23 and a standard tap selecting section 24, which set different pixel (tap) patterns. In these tap pattern selecting sections, tap patterns p0, p1, and p2 related to spatial classes are set with respect to each of unit blocks of input SD image signal $S_1$.

Figure 6:
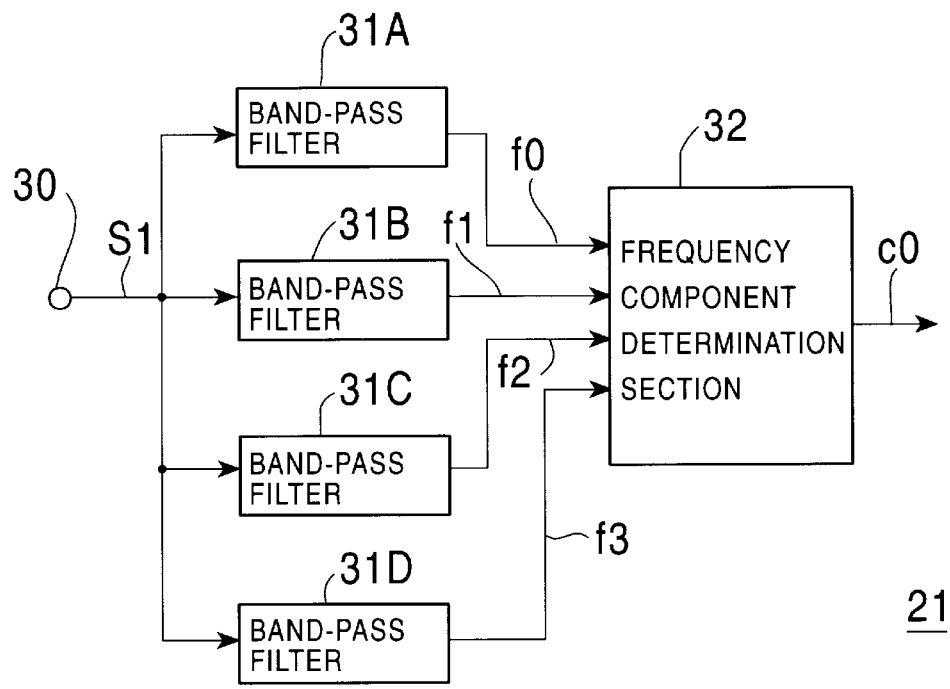
FIG. 6 is a block diagram of an example of a frequency characteristic determination section in the classification unit shown in FIG. 5.

As shown in FIG. 6, a plurality of band-pass filters having different characteristics are provided in the frequency characteristic determination section 21.

Figure 7:
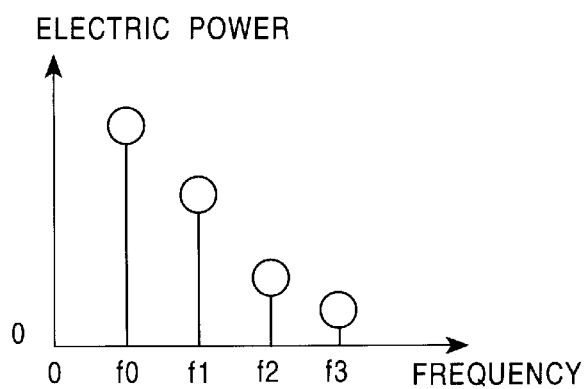
FIG. 7 is a graph showing an example of a characteristic of frequency components of an input signal separated by band-pass filters.

Each of the unit blocks of SD image signal $S_1$ input to the frequency characteristic determination section 21 through an input terminal 30 is separated into frequency components, e.g., those indicated by f0 to f3 in FIG. 7 according to characteristics of band-pass filters 31A to 31D. These frequency components are sent to a frequency component determination section 32.

In the frequency characteristic shown in FIG. 7, the level of output f0 of the lowest-frequency component is apparently highest. Under this condition, the frequency component determination section 32 forms a frequency class c0 according to frequency classification presupposing certain steadiness. If outputs f2 and f3 of higher-frequency components are larger than output f0 of the lowest-frequency component, the frequency component determination section 32 forms a frequency class c0 presupposing non-steadiness.

Frequency class c0 thus formed is sent to the selecting section 25 and the ADRC classification section 26 in the classification unit 12.

Classification in the selecting section 25 and the ADRC classification section 26 will next be described in detail.

The wide-region tap selecting section 22 in the three types of spatial class tap selecting sections observes steady variation of input SD image signal $S_1$. That is, the wide-region tap selecting section 22 sets a wide-region class tap pattern such as that shown in FIG. 8(A). The standard tap selecting section 24 observes standard variation of input SD image signal $S_1$ and sets an ordinary spatial class tap pattern such as that shown in FIG. 8(B). The narrow-region tap selecting section 23 observes non-steady variation of input SD image signal $S_1$ and sets a narrow-region class tap pattern such as that shown in FIG. 8(C) with respect to a non-steady signal change.

The wide-region tap selecting section 22, the narrow-region tap selecting section 23 and the standard tap selecting section 24 send spatial class tap patterns p0, p1 and p2 set therein to the selecting section 25. The selecting section 25 selects one of the tap patterns of the tap patterns p0, p1 and p2 as a class tap by using class c0 sent from the frequency characteristic determination section 21 as a selection control signal. The selecting section 25 outputs selected tap pattern p3 to the ADRC classification section 26.

The ADRC classification section 26 sets the number of requantization bits of ADRC by using as a control signal class c0 obtained according to the frequency characteristics of input SD image signal $S_1$, thereby enabling the level resolution of the taps of each spatial class tap pattern to be set variably according to the frequency component distribution of SD image signal $S_1$.

In ADRC, pixels are requantized by a step width of quantization defined as requantization, and ADRC code $c_i$ is expressed by the following equation using a dynamic range DR, the number k of requantization bits, SD pixel $x_i$ and the minimum pixel level MIN in a vicinal area about the same:

$$c_i = \frac{x_i - \text{MIN}}{\frac{DR}{2^k}} \quad (1)$$

Specifically, the level resolution of the spatial class tap pattern is changed by changing the number k of requantization bits in ADRC calculation of equation (1) according to class c0. Thus, the level resolution can be variably set according to the frequency distribution of the input signal.

ADRC code $c_i$ is formed as described above and is combined with each spatial class to obtain a classification result, i.e., class c1. Consequently, in the classification unit 12, class d0 is formed by class c0 and class c1. Class d0 thus formed is sent as address data to the prediction coefficient ROM 14 in the subsequent stage.

The classification unit 12 sets class formation taps of seven pixels with respect to input SD image signal $S_1$ to form classes according to the waveform characteristics of the input signal. If 8-bit pulse code modulation (PCM) data for seven pixels is directly used to form such classes, the number of classes is very large, $2^{56}$, which is undesirable in terms of practice. Therefore, 8-bit pulse code modulation (PCM) data for seven pixels is processed by data compression based on ADRC requantization. That is, the minimum value of seven pixels is eliminated on the basis of dynamic range defined from data on the seven pixels, and the pixel level of each pixel is adaptively 1-bit quantized, thereby reducing the number of classed to 128. Incidentally, ADRC has been developed as a signal compression method for video tape recorders (VTR) and is suitable for expressing waveform characteristics of an input signal by a smaller number of classes.

From prediction coefficient ROM 14, prediction data d1 used when HD pixels are formed is read out by using class data d0 as address data. Prediction data d1 read out is sent to the prediction calculation unit 13. The prediction calculation sections 13A to 13D form assumed pixels $y_i$ representing HD pixels and formed of interpolated pixels corresponding to mode-1 to mode-4 positions on scanning lines 1A by using SD pixels $x_i$ of SD image signal $S_1$ and prediction coefficients $\omega_i$ formed by prediction data d1 related to the classes.

Figure 9:
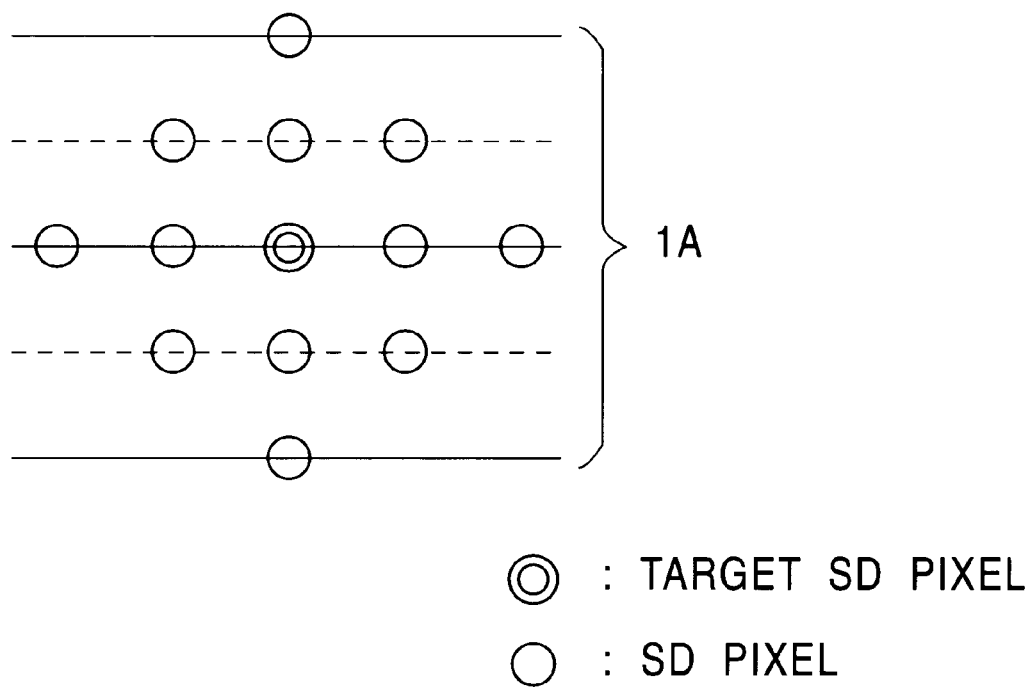
FIG. 9 is a schematic diagram showing an example of prediction taps of learning data.

For example, SD pixels $x_i$ used for this formation are formed of thirteen tap data items shown in FIG. 9, i.e., a target pixel (represented by ⊙) and peripheral pixels (represented by ○).

Assumed pixels $y_i$ representing HD pixels are formed by signal conversion of the following prediction equation using the above-mentioned SD pixels $x_i$ and prediction coefficients $\omega_i$:

$$y_i = \sum_{i=1}^{i=13} \omega_i \times x_i = \omega_1 \times x_1 + \ldots + \omega_{13} \times x_{13} \quad (2)$$

Prediction coefficients $\omega_i$ used in this processing are previously obtained by learning and stored in the prediction coefficient ROM 14.

Learning of prediction coefficients related to classes and stored in the prediction coefficient ROM 14 will now be described.

Figure 10:
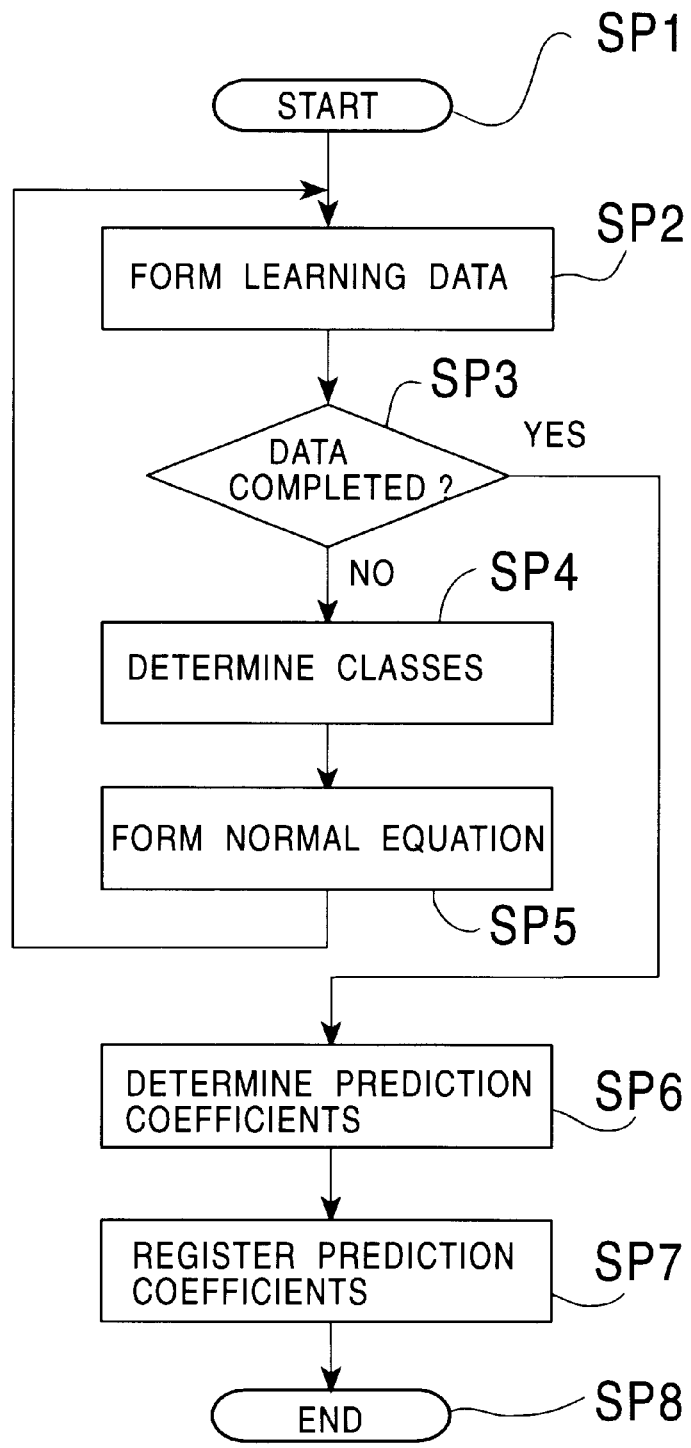
FIG. 10 is a flowchart of an example of a prediction coefficient learning process.

Prediction coefficients are obtained by a prediction coefficient learning process shown in FIG. 10. When the prediction coefficient learning process starts at Step SP1, learning data corresponding to a known image is formed in Step SP2 for the purpose of learning prediction coefficients.

Figure 1:
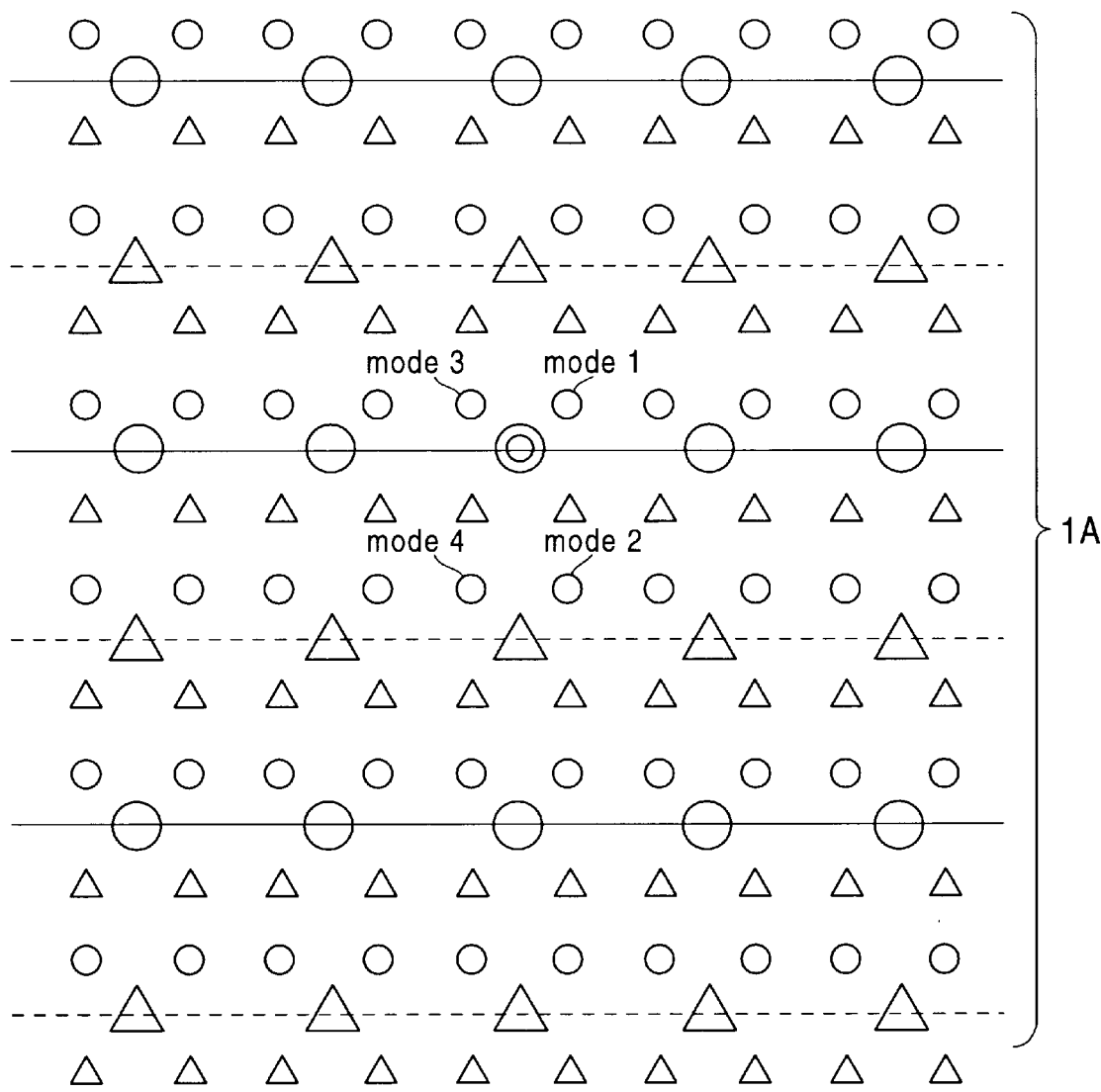
FIG. 1 is a schematic diagram showing the relationship between an input image signal and HD pixels.
Figure 2:
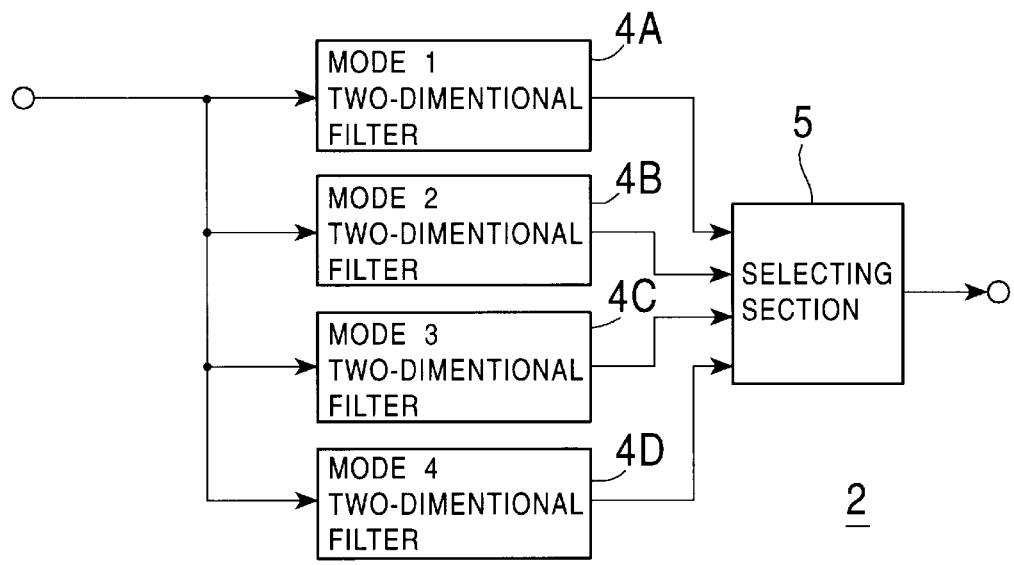
FIG. 2 is a block diagram of an example of a two-dimensional nonseparable filter.
Figure 3:
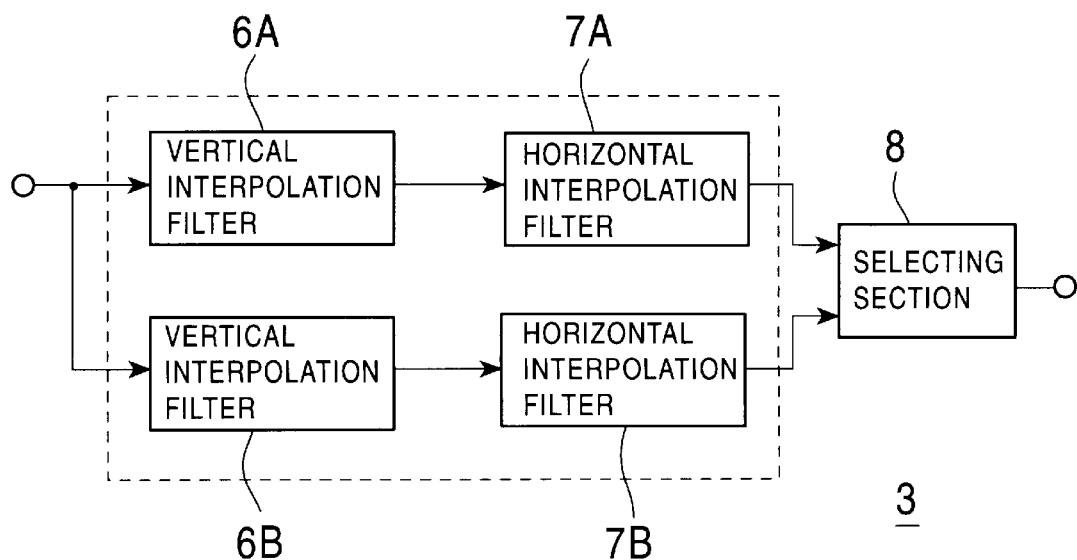
FIG. 3 is a block diagram of an example of a vertical-horizontal separable filter.

More specifically, one of HD pixels of HD image 1 shown in FIG. 1 is assumed to be a target HD pixel and is expressed by a linear first-order combination model using prediction coefficients and formed by a set of learning data consisting of peripheral HD and SD pixels. Prediction coefficients used for such an expression are obtained with respect to each class by least square. At the time of formation of such learning data, a multiplicity of learning data items may be formed by using a plurality of images instead of one image to obtain prediction coefficients with higher accuracy.

In Step SP3, determination is made as to whether a necessary number of learning data items for obtaining prediction coefficients have been obtained in Step SP2. If it is determined that the necessary number of learning data items has not been reached, the prediction coefficient learning process advances to Step SP4.

In Step SP4, class learning data is classified. For classification, local flatness of sampled learning data is first detected and pixels used for classification are selected according to the result of this detection. Pixels relating to a small change in the input signal are thereby excluded from the learning object to eliminate the influence of noise. This class learning data classification is made by performing the same processing as that in the case of classifying input SD image signal $S_1$.

That is, for classification of class learning data, frequency characteristics of learning data are sorted and evaluated to set frequency class c0. Subsequently, one of the three types of tap patterns, i.e., the wide-region, narrow-region and standard tap patterns, is selected as spatial class c1 on the basis of frequency class c0. Frequency classes c0 and spatial classes c1 obtained in this manner are combined as shown in FIG. 11. Classes d0 thereby obtained are stored in the ROM in correspondence with prediction coefficients d1. Thus, classification is achieved in which learning data is related to prediction coefficients d1 with respect to each class.

Subsequently, in Step SP5 of the prediction coefficient learning process, an normalization equation is formed with respect to each class on the basis of the classified learning data.

Processing of Step SP5 will be described in detail.

A generalized case where n sampled pixels exist as learning data will be described. First, the relationship between pixel levels $x_1, \ldots, x_n$ of sampled pixels and the pixel level y of a target interpolated pixel before subsampling is expressed with respect to each class by a prediction equation based on a linear first-order combination model of n taps using prediction coefficients $$\omega_1, \cdots, \omega_n : \quad (3)$$
$$y = \sum_{i}^{n} \omega_i \times x_i$$

The pixel level y is estimated by determining prediction coefficients $\omega_1, \ldots, \omega_n$ in this equation (3).

An example of formation of prediction coefficients $\omega_1, \ldots, \omega_n$ by least square will next be described. Least square is applied as described below.

For a generalized example, an observation equation of X representing input data, W representing prediction coefficients and Y representing assumed values can be written:

$$XW = Y \quad (4)$$

where $$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{pmatrix},$$

$$W = \begin{pmatrix} \omega_1 \\ \omega_2 \\ \cdots \\ \omega_n \end{pmatrix},$$

$$Y = \begin{pmatrix} y_1 \\ y_2 \\ \cdots \\ y_m \end{pmatrix}.$$

Least square is applied to data collected by this observation equation (4). In the example using equation (4), n=13 and m is the number of learning data items.

First, on the basis of observation equation (4), the following residual equation is written:

$$XW = Y + E \quad (5)$$

where $$E = \begin{pmatrix} e_2 \\ \cdots \\ e_m \end{pmatrix}$$

From residual equation (5), it is supposed that the most probable value of each $\omega_i$ corresponds to the case where a condition of minimizing the following expression:

$$\sum_{i=1}^{m} \varepsilon_i^2 \quad (6)$$

is satisfied.

That is, n conditions with respect to i in an equation (7) shown below when a partial differentiation of equation (6) by $\omega_i$ is as expressed by this equation (7) are considered and $\omega_1, w_2, \ldots, \omega_n$ satisfying these conditions may be calculated.

$$e_1 \frac{\partial e_1}{\partial \omega_i} + e_2 \frac{\partial e_2}{\partial \omega_i} + \cdots e_m \frac{\partial e_m}{\partial \omega_i} = 0 \quad (7)$$

$$(i = 1, 2, \ldots, n)$$

Then, from residual equation (5), the following equations can be obtained:

$$\frac{\partial e_i}{\partial \omega_1} = x_{i1}, \frac{\partial e_i}{\partial \omega_2} = x_{i2}, \cdots, \frac{\partial e_i}{\partial \omega_n} = x_{im} \quad (8)$$

$$(i = 1, 2, \ldots, n)$$

From this equation (8) and equation (7), the following equations are obtained:

$$\sum_{i=1}^{n} \varepsilon_i x_{i1} = 0, \sum_{i=1}^{n} \varepsilon_i x_{i2} = 0, \cdots, \sum_{i=1}^{n} \varepsilon_i x_{i1} = 0 \quad (9)$$

From equations (5) and (9), the following normal equations are obtained:

$$\left(\sum_{j=1}^{m} x_{j1} x_{j1}\right) \omega_1 + \left(\sum_{j=1}^{m} x_{j1} x_{j2}\right) \omega_2 + \cdots + \left(\sum_{j=1}^{m} x_{j1} x_{jn}\right) \omega_n = \left(\sum_{j=1}^{m} x_{j1} y_j\right) \quad (10)$$

$$\left(\sum_{j=1}^{m} x_{j2} x_{j1}\right) \omega_1 + \left(\sum_{j=1}^{m} x_{j2} x_{j2}\right) \omega_2 + \cdots + \left(\sum_{j=1}^{m} x_{j2} x_{jn}\right) \omega_n = \left(\sum_{j=1}^{m} x_{j2} y_j\right)$$

$$\vdots$$

$$\left(\sum_{j=1}^{m} x_{jn} x_{j1}\right) \omega_1 + \left(\sum_{j=1}^{m} x_{jn} x_{j2}\right) \omega_2 + \cdots + \left(\sum_{j=1}^{m} x_{jn} x_{jn}\right) \omega_n = \left(\sum_{j=1}^{m} x_{jn} y_j\right)$$

The same number of normal equations (10) as the number n of the unknowns can be set. Therefore, the most probable value of each $\omega_i$ can be obtained from equations (10).

These normal equations can be solved by using a sweeping-out method (Gauss-Jordan elimination method).

In the prediction coefficient learning process, to calculate undetermined coefficients $\omega_1, \ldots, \omega_n$ with respect to each class, the loop SP2-SP3-SP4-SP5-SP2 is repeated until the same number of normalization equations as the number n of the unknowns are formed.

When the necessary number of normalization equations are obtained, the result of determination in Step SP3 as to whether the formation of learning data has been completed is affirmative and the process moves to Step S6 for determination of prediction coefficients.

In Step SP6, the normalization equations shown above as equations (1) are solved to determine prediction coefficients $\omega_1, \ldots, \omega_n$ with respect to each class. In the next step SP7, the prediction coefficients thus obtained are registered by a memory means such as a ROM in which address division is made with respect to the classes. By the above-described learning, prediction coefficients for classification adaptive processing are formed and the prediction coefficient learning process ends in Step SP8.

In the above-described processing system, SD image signal $S_1$ input to the up-converter 10 is sent to the classification unit 12 and the prediction coefficient calculation unit 13 in a parallel manner. In the classification unit 12, class data d0 is formed on the basis of SD image signal $S_1$ to be sent to the prediction coefficient ROM 14. From the prediction coefficient ROM 14, prediction coefficients d1 previously obtained by learning are read out according to class data d0 to be sent to the prediction coefficient calculation unit 13. In the prediction calculation sections 13A to 13D of the prediction coefficient calculation unit 13, HD pixels corresponding to the four positions (mode 1 to mode 4) on the scanning lines are formed on the basis of SD image signal $S_1$ sent from input terminal 11 and prediction coefficients d1 sent from the prediction coefficient ROM 14.

The classification unit 12 separates input SD image signal $S_1$ into a plurality of frequency components f0 to f3 in frequency regions, frequency characteristics of SD image signal $S_1$ are determined on the basis of distribution characteristics of frequency components f0 to f3, and the result of this determination is sent as class c0 to the selecting section 25 and the ADRC classification section 26.

Figure 8:
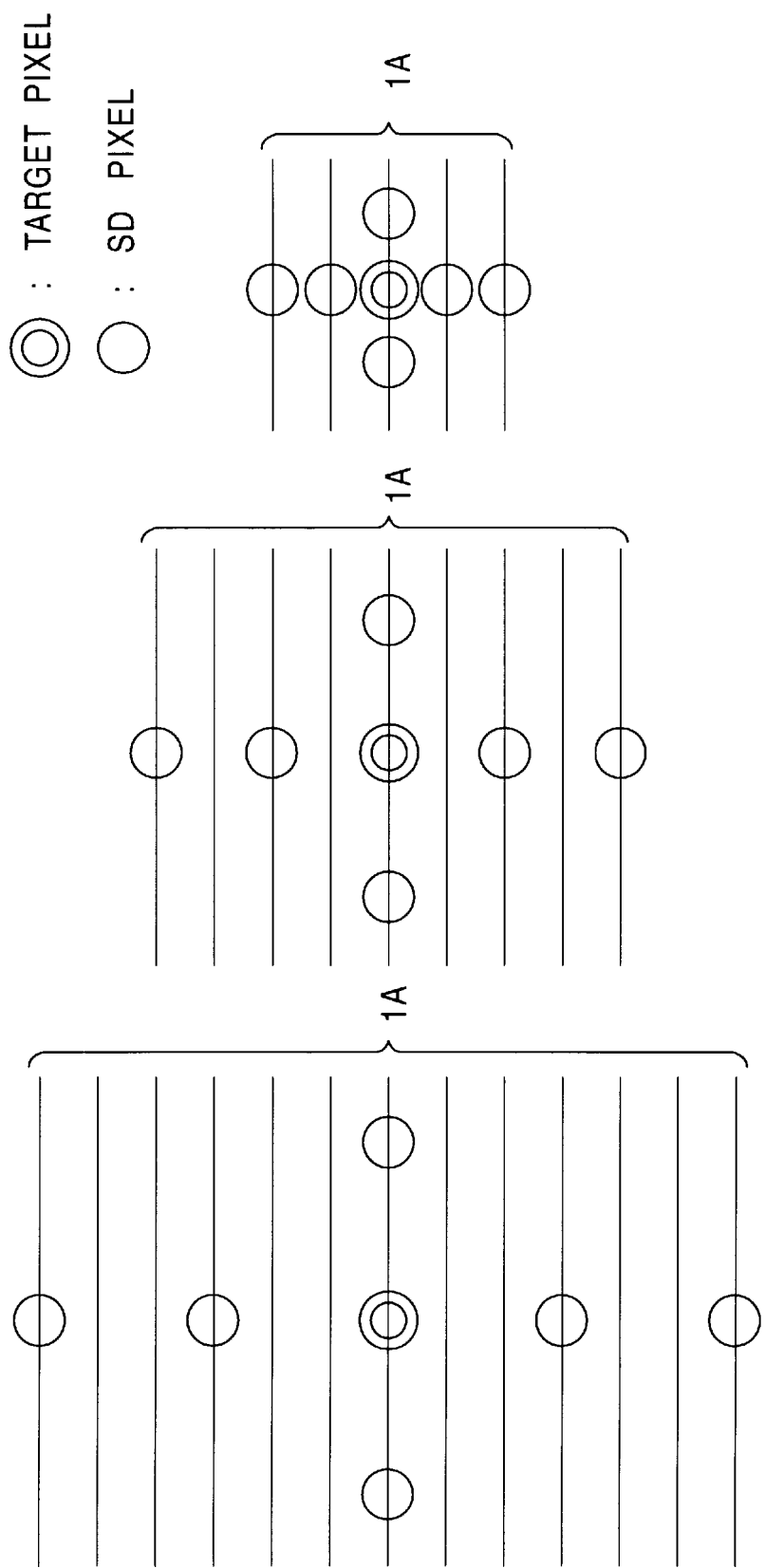
FIGS. 8A to 8C are schematic diagrams of examples of spatial class tap patterns.

The selecting section 25 selects class tap pattern p0 for a signal change of a comparatively large region such as shown in FIG. 8(A) with respect to SD image signal $S_1$ in which low-frequency components are predominant, thereby enabling a gentle signal change to be reflected in the selected tap pattern. On the other hand, the selecting section 25 sets class tap pattern p2 of a small region such as shown in FIG. 8(C) with respect to SD image signal $S_1$ in which high-frequency components are predominant and which has a steep signal change, thereby expressing a signal change of the small region by a maximized number of classes. In this manner, from SD image signal $S_1$ having signal characteristics similar to those mentioned above as seen in the frequency regions, classes adapted to the signal characteristics are formed.

The ADRC classification section 26 sets, on the basis of class c0, a smaller number of requantization bits of each tap for spatial classification with respect to SD image signal $S_1$ in which low-frequency components are predominant. The level resolution of each tap is thereby reduced, thus enabling classification presupposing steadiness. On the other hand, the ADRC classification section 26 sets a larger number of requantization bits of each tap for spatial classification with respect to SD image signal $S_1$ in which high-frequency components are predominant, thereby increasing the level resolution. Thus, non-steady variation of SD image signal $S_1$ can be reflected in classes.

As described above, the classification unit 12 changes the pixel tap patterns for classification according to distribution characteristics of the frequency of input SD image signal $S_1$, and changes the number of requantization bits of each tap for spatial classification to adjust the level resolution. Thus, suitable classification can be made according to the frequency characteristics of input SD image signal $S_1$.

The classification unit 12 sends classes obtained by combining classes c0 and c1 to the prediction coefficient ROM 14 in the subsequent stage. The prediction coefficient ROM 14 reads out prediction data d1 on the basis of classes d0 and sends prediction data d1 to the prediction calculation unit 13. The prediction calculation unit 13 converts SD pixels by using this prediction data d1 to form HD pixels. Consequently, prediction data d1 of HD pixels reflecting the frequency characteristics of input SD image signal $S_1$ can be obtained. Thus, the accuracy of HD pixels formed by conversion of SD pixels can be improved to prevent a reduction in the definition restoring ability.

In the above-described system, the frequency of SD image signal $S_1$ input to the up-converter 10 is extracted in the frequency characteristic determination section 21 to determine distribution characteristics of the signal in frequency regions and to obtain class data c0, and each of three types of spatial class tap patterns can be selected on the basis of class data c0 according to the distribution characteristics of SD image signal $S_1$ in the frequency regions. Further, the number of requantization bits of each tap for spatial classification is changed according to class c0 to change the level resolution, thereby enabling the case where the signal variation is steady and the case where the signal variation is not steady to be reflected in classification. Thus, it is possible to form HD image signal S2 which has a high spatial definition and in which the characteristics of input SD image signal $S_1$ are reflected.

The embodiments have been described with respect to a case of using ADRC techniques for data compression of tap data. However, the present invention is not limited to this and may alternatively be arranged to perform data compression by using techniques of differential pulse code modulation (DPCM) or vector quantization (VQ), for example.

The embodiments have also been described with respect to a case of setting three types of spatial tap patterns, i.e., wide-region, narrow-region and standard tap patterns. According to the present invention, however, these tap patterns are not exclusively used and two types of tap patterns or four or more types of tap patterns may alternatively be set.

Figure 12:
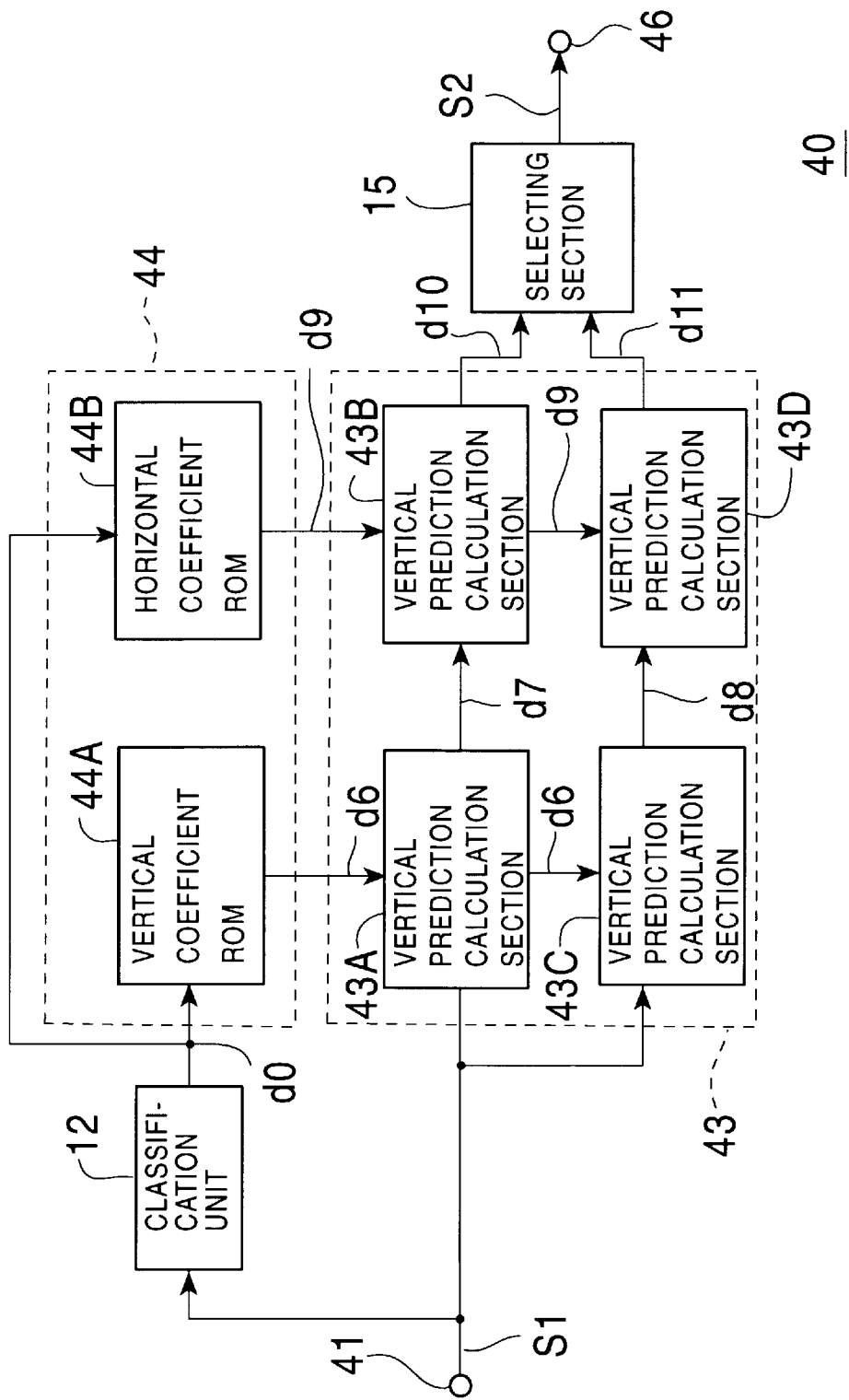
FIG. 12 is a block diagram of another embodiment of the signal converter of the present invention.

The embodiments have also been described with respect to a case of using a two-dimensional separable filter in an up-converter. According to the present invention, however, an up-converter 40 having a vertical-horizontal separable configuration such as that shown in FIG. 12 may alternatively be used. In FIG. 12, sections corresponding to those shown in FIG. 4 are indicated by the same reference characters.

In the up-converter 40, SD image signal $S_1$ input through an input terminal 41 is first supplied to a classification unit 12 and to a prediction calculation unit 43 which is formed of two groups of sections, i.e., a group consisting of a vertical prediction calculation section 43A and a horizontal prediction calculation section 43B corresponding to mode-1 and mode-2 positions on the scanning lines, and another group consisting of a vertical prediction calculation section 43C and a horizontal prediction calculation section 43D corresponding to mode-3 and mode-4 positions on the scanning lines. The classification unit 12 forms classes d0 are formed according to input SD image signal $S_1$ and sends classes d0 to a prediction coefficient ROM 44 which is a storage means in which tap prediction coefficients are previously stored. The prediction coefficient ROM 44 is divided into a vertical coefficient ROM 44A and a horizontal coefficient ROM 44B for storing vertical and horizontal components. Classes d0 are supplied to each of the vertical coefficient ROM 44A and the horizontal coefficient ROM 44B.

First, vertical prediction coefficients d6 output from the vertical coefficient ROM 44A are supplied to the vertical prediction calculation sections 43A and 43C.

Assumed vertical values d7 and d8 are formed by multiplication and addition of input SD image signal $S_1$ and vertical prediction coefficients d6. These assumed vertical values d7 and d8 are supplied to the subsequent horizontal prediction calculation sections 43B and 43D.

Horizontal prediction coefficients d9 formed from the horizontal coefficient ROM 44B are supplied to the horizontal prediction calculation sections 43B and 43D, and signals representing HD pixels d10 and d11 are obtained by multiplication and addition of horizontal prediction coefficients d9 and the assumed vertical values d7 and d8.

The HD pixel d10, d11 signals are selectively transmitted and suitably rearranged in a selecting unit 15 to be finally output through an output terminal 46 as HD image signal $S_2$.

The embodiments have also been described with respect to a case of classifying frequency components of input SD image signal $S_1$ by using band-pass filters 31A to 31D. However, the present invention may alternatively be arranged to separate frequency components of input SD image signal $S_1$, for example, by orthogonal transformation based on Hadamard transformation.

Figure 13:
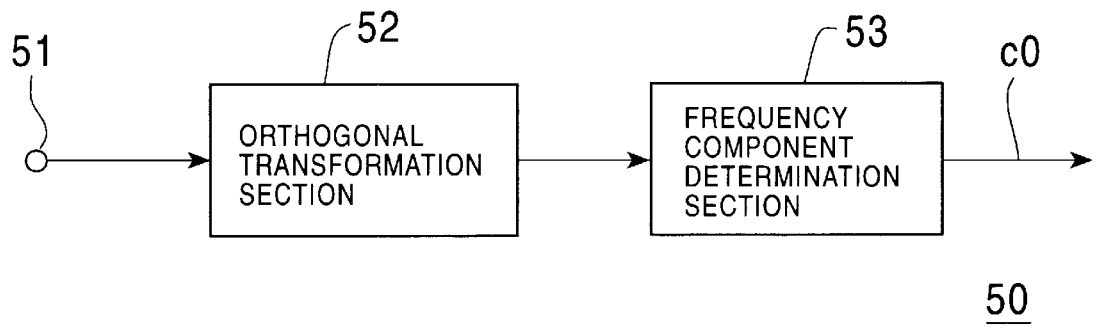
FIG. 13 is a block diagram of an example of an arrangement for frequency classification by orthogonal transformation.

That is, as shown in FIG. 13, unit blocks of SD image signal $S_1$ input to a frequency characteristic determination unit 50 through an input terminal are converted by orthogonal transformation in an orthogonal transformation section 52 to form classes c0 as a classification signal in a frequency characteristic determination section 53. The classification signal is output to prediction coefficient ROM 14 in the subsequent stage.

The orthogonal transformation section 52 is formed by an orthogonal transformation matrix which is constituted of a plurality of orthogonal transformation bases orthogonal to each other. The orthogonal transformation section 52 separates each of predetermined unit blocks of input SD image signal $S_1$, into several orthogonal transform components independent of and non-correlated with each other by orthogonal transformation.

In the orthogonal transformation section 52, input one-dimensional SD image signal $S_1$ undergoes quartic Hadamard transformation. That is, this quartic Hadamard transformation can be expressed by the following equation of input data X, Hadamard transformation matrix H and output Y:

$$Y = HX \qquad (11)$$

where $$H = \begin{pmatrix} +1 & +1 & + & +1 \\ +1 & -1 & +1 & -1 \\ +1 & +1 & -1 & -1 \\ +1 & -1 & -1 & +1 \end{pmatrix},$$

$$X = \begin{pmatrix} x_1 \\ x_2 \\ x_3 \\ x_4 \end{pmatrix},$$

$$Y = \begin{pmatrix} y_1 \\ y_2 \\ y_3 \\ y_4 \end{pmatrix}$$

As can be understood from the coefficients of Hadamard transformation matrix H of this equation (11), the output can be obtained only by addition and subtraction if Hadamard transformation is performed, so that the burden on the circuit is small.

In quartic Hadamard transformation, four Hadamard bases exist in Hadamard transformation matrix H. The bases are orthogonal to each other and enable separation into several frequency components.

Four Hadamard components y1 to y4 can be obtained by calculation of the Hadamard bases and the input signal.

Hadamard-transformed components y1 to y4 formed in the orthogonal transformation section 52 are sent to the frequency characteristic determination section 53 in the subsequent stage.

Hadamard-transformed components y1 to y4 correspond to four kinds of frequency components f0 to f3 shown in FIG. 7, for example. The frequency characteristic determination section 53 determines frequency classes by combinations of frequency components f0 to f3 in the same manner as the arrangement using band-pass filters.

For example, a criterion of this determination is such that the proportion of low-frequency components and the proportion of high-frequency components in the frequency of input SD image signal $S_1$, are compared. That is, classification is performed by attaching much importance to steadiness if the proportion of low-frequency components is greater, and by taking non-steadiness into consideration if the proportion of high-frequency components is greater. In this manner, classes c0 are formed as classification data for controlling the selection of class tap patterns.

As described above, processing using quartic Hadamard transformation for frequency component classification enables formation of classes c0 as data for classification, as does processing using band-pass filters. Hadamard transformation for frequency component classification is not limited to quartic Hadamard transformation and may be, for example, eighth-degree Hadamard transformation. If Hadamard transformation is of the eighth degree, eight Hadamard-transformed components are obtained, so that finer frequency component classification can be achieved.

There are other various orthogonal transformation techniques, e.g., Fourier transformation, Kahrunen-Loeve transformation, Haar transformation, discrete cosine transformation (DCT). One of such orthogonal transformation techniques may be used to effect orthogonal transformation of input SD image signal $S_1$ to enable frequency separation and evaluation equivalent to those described above.

The embodiments have also been described with respect to a case where, of the class data of classes d0 used when prediction coefficients of a prediction equation are selected, both the tap pattern and the number of requantization bits are changed according to the frequency characteristics of input SD image signal $S_1$ through the combination of classes c0 and classes c1. However, the present invention is not limited to this method and may alternatively be arranged so that only one of the tap pattern and the number of requantization bits of the class data is changed.

Figure 14:
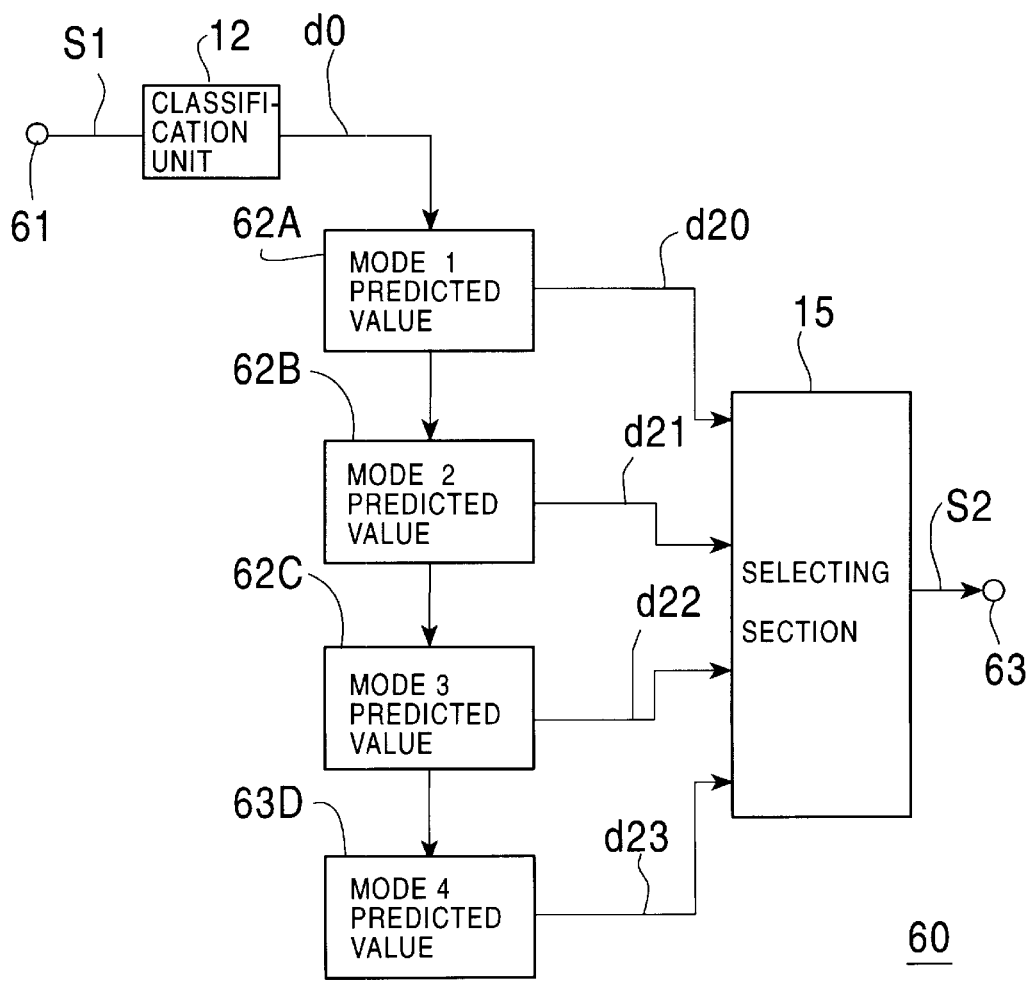
FIG. 14 is a block diagram of a further embodiment of the signal converter of the present invention.

The embodiments have also been described with respect to a case where HD pixels about a target HD pixel are formed from SD pixels by using prediction coefficients which represent the correlation between the target HD pixel and pixels about the target pixel. nowever, the present invention is not limited to this method and may alternatively be arranged so that predicted values of a target HD pixel with respect to classes are previously set and stored in a storage means instead of prediction coefficients. For signal conversion of an SD image signal to an HD image signal by such predicted values, an up-converter 60 arranged as shown in FIG. 14 is used. Sections of this up-converter corresponding to these of FIG. 4 are indicated by the same reference characters.

In the up-converter 60, SD image signal $S_1$ is supplied to a classification unit 12 through an input terminal 61. The classification unit 12 forms classes d0 on the basis of features of SD image signal $S_1$ about an HD image signal newly formed, and sends classes d0 to predicted value ROMs 62A to 62D. In the predicted value ROMs 62A to 62D, predicted values of HD pixels previously obtained by learning and corresponding to interpolated pixels about one target pixel are stored in correspondence with classes d0. The predicted value ROMs 62A to 62D read out predicted values d20 to d23 by using classes d0 as address data. A selecting unit 15 rearranges these values to form HD image signal $S_2$ and outputs this signal through an output terminal 63. Thus, the predicted values read out according to classes d0 are used as interpolated pixels of SD pixels of input SD image signal $S_1$, thereby obtaining a high-definition image signal with respect to an input image signal.

A first example of a method for calculating predicted values is a learning method using a weighted mean method. In the weighted mean method, various images undergo such processing that a target pixel is classified by using SD pixels around the target pixel, and that the pixel value of target pixels (i.e., HD pixels) added up with respect to each class is divided by the frequency incremented according to the number of the target pixels, thereby obtaining predicted values.

A second method for obtaining predicted values is a learning method based on normalization. In this learning method, a block formed of a plurality of pixels including a target pixel is first formed and a value obtained by subtracting a reference value of the block from the pixel value of the target pixel is normalized by the dynamic range in the block.

Next, a cumulative value of the value normalized in this manner is divided by the cumulative frequency to obtain a predicted value.

The embodiments have also been described with respect to a case where an SD image signal is converted into an HD image signal. However, the present invention is not limited to this kind of processing and may also be applied to the formation of interpolated pixels when an image is enlarged.

According to the present invention, as described above, frequency characteristics of an input image signal are classified and evaluated with respect to predetermined unit blocks, and pixel patterns are set with respect to each of unit blocks of the input image signal according to the frequency characteristics to set spatial classes. A class code is set with respect to the input image signal forming one of the pixel patterns by setting the number of quantization bits according to the corresponding frequency characteristic and by effecting data compression, thus performing suitable classification of the input image signal according to the frequency characteristics. Interpolated pixels are formed from the pixels of the input image signal by using prediction coefficients or predicted value based on the result of this classification. Thus, a signal converter and a signal conversion method can be realized in which a high-definition image signal is formed with respect to an input image signal.

What is claimed is:

1. A signal converter for converting a low-definition input image signal into a high-definition image signal, said signal converter comprising:

frequency characteristic determination means for evaluating a frequency characteristic of the input image signal with respect to each of predetermined unit blocks;

selecting means for selecting a pixel pattern according to the evaluated frequency characteristic to determine a class;

classification means for forming said class based on the pixel pattern of the input image signal selected by said selecting means;

prediction coefficient storage means for storing, in correspondence with each class, prediction coefficients which are read out for predicting and forming pixels from pixels of the input image signal; and prediction calculation means for forming a high-definition image signal with respect to the input image signal by prediction calculation processing of the input image signal using the prediction coefficients read out of said prediction coefficient storage means according to the class.

2. A signal converter according to claim 1, wherein said selecting means comprises wide-region pixel selecting means for setting said pixel pattern over a wide region, narrow-region pixel selecting means for setting a pixel pattern over a narrow region that is narrower than the wide region, and standard pixel selecting means for setting a standard pixel pattern which is intermediate between the patterns set by said wide-region pixel selecting means and said narrow-region pixel selecting means; and pixel pattern selecting means for selecting one of the wide region, narrow region and standard pixel patterns according to the evaluated freguency characteristics.

3. A signal converter according to claim 1, wherein said frequency characteristic determination means separates the input image signal in the predetermined block into frequency components and evaluates a distribution characteristic of the frequency components.

4. A signal converter according to claim 1, wherein said frequency characteristic determination means evaluates the frequency characteristic by separating the input image signal in the predetermined block into orthogonal transform components by orthogonal transformation.

5. A signal converter according to claim 3, wherein said frequency characteristic determination means divides the frequency of the input image signal in the predetermined block into a plurality of frequency components by band-pass filters.

6. A signal converter for converting a low-definition input image signal into a high-definition image signal, said signal converter comprising:

frequency characteristic determination means for evaluating a frequency characteristic of the input image signal with respect to each of predetermined unit blocks;

pixel pattern setting means for setting a pixel pattern from the input image signal for each of the unit blocks;

classification means for forming a class code representing a class to which the input image signal forming the pixel pattern belongs by setting a quantization condition with respect to the input image signal according to the evaluated frequency characteristic and data compressing the input image signal;

prediction coefficient storage means for storing, in correspondence with each class code, prediction coefficients for predicting and forming pixels from pixels of the input image signal; and prediction calculation means for forming a high-definition image signal with respect to the input image signal by prediction calculation processing the input image signal using the prediction coefficients read out of said prediction coefficient storage means according to the class code.

7. A signal converter according to claim 6, wherein said frequency characteristic determination means separates the input image signal in the predetermined block into frequency components and evaluates a distribution characteristic of the frequency components.

8. A signal converter according to claim 6, wherein said frequency characteristic determination means evaluates the frequency characteristic by separating the input image signal in the predetermined block into orthogonal transform components by orthgonal transformation.

9. A signal converter according to claim 7, wherein said frequency characteristic determination means divides the frequency of the input image signal in the predetermined block into a plurality of frequency components by band-pass filters.

10. A signal converter for converting a low-definition input image signal into a high-definition image signal, said signal converter comprising:

frequency characteristic determination means for evaluating a frequency characteristic of the input image signal with respect to each of predetermined unit blocks;

selecting means for selecting a pixel pattern according to the evaluated frequency characteristic to determine a class;

classification means for forming a class code representing a class to which the input image signal forming the pixel pattern selected by said selecting means belongs by setting a quantization condition with respect to the input image signal according to the evaluated frequency characteristic, and data compressing the input image signal;

prediction coefficient storage means for storing, in correspondence with each class and class code, prediction coefficients which are read out for predicting and forming pixels from pixels of the input image signal; and prediction calculation means for forming a high-definition image signal with respect to the input image signal by prediction calculation processing of the input image signal using the prediction coefficients read out of said prediction coefficient storage mans according to the class and class code.

11. A signal converter according to claim 10, wherein said selecting means comprises wide-region pixel selecting means for setting said pixel pattern over a wide region, narrow-region pixel selecting means for setting a pixel pattern over a narrow region that is narrower than the wide region, and standard pixel selecting means for setting a standard pixel pattern which is intermediate between the patterns set by said wide-region pixel selecting means and said narrow-region pixel selecting means; and pixel pattern selecting means for selecting one of the wide region, narrow region and standard pixel patterns according to the evaluated frequency characteristics.

12. A signal converter according to claim 10, wherein said frequency characteristic determination means separates the input image signal in the predetermined block into frequency components and evaluates a distribution characteristic of the frequency components.

13. A signal converter according to claim 10, wherein said frequency characteristic determination means evaluates the frequency characteristic by separating the input image signal in the predetermined block into orthogonal transform components by orthogonal transformation.

14. A signal converter according to claim 12, wherein said frequency characteristic determination means divides the frequency of the input image signal in the predetermined block into a plurality of frequency components by band-pass filters.

15. A signal conversion method for converting a low-definition input image signal into a high-definition image signal, said method comprising the steps of:

evaluating frequency characteristics of the input image signal with respect to predetermined unit blocks;

selecting a pixel pattern according to the evaluated frequency characteristics;

forming a class based on the selected pixel pattern; and converting the input image signal into a high-definition image signal by reading out previously-obtained prediction coefficients stored for each class in a memory according to the class and prediction calculation processing the input image signal using the read out prediction coefficients such that pixels from pixels of the input image signal are formed.

16. A signal conversion method for converting a low-definition input image signal into a high-definition image signal, said method comprising the steps of:

evaluating frequency characteristics of the input image signal with respect to predetermined unit blocks;

setting a pixel pattern from the input image signal with respect to each of the unit blocks;

forming a class code representing a class to which the input image signal forming the pixel pattern belongs by setting a quantization condition with respect to the input image signal according to the evaluated frequency characteristics and data compressing the input image signal; and converting the input image signal into a high-definition image signal by reading out previously-obtained prediction coefficients stored for each class in a memory according to the class code and prediction calculation processing the input image signal using the read out prediction coefficients such that interpolated pixels are formed from pixels of the input image signa.

17. A signal conversion method for converting a low-definition input image signal into a high-definition image signal, said method comprising the steps of:

evaluating frequency characteristics of the input image signal with respect to predetermined unit blocks;

setting a spatial class by selecting a pixel pattern according to the evaluated frequency characteristic;

forming a class code representing a class to which the input image signal forming the selected pixel pattern belongs by setting a quantization condition with respect to the input image signal according to said evaluated frequency characteristic and data compressing the input image signal; and converting the input image signal into a high-definition image signal by reading out previously-obtained prediction coefficients stored for each class in a memory according to the class and the class code and prediction calculation processing the input image signal using the read out prediction coefficients such that interpolated pixels are formed from pixels of the input image signal.

18. A signal conversion method for converting a low-definition input image signal into a high-definition image signal, said method comprising the steps of:

evaluating frequency characteristics of the input image signal with respect to predetermined unit blocks;

selecting a pixel pattern according to the evaluated frequency characteristic; forming a class based on the input image signal forming the selected pixel pattern; and converting the input image signal into a high-definition image signal by reading out previously-obtained prediction data stored for each class in a memory according to the class and by using the read out prediction data as pixels of the high-definition image signal.

19. A signal conversion method for converting a low-definition input image signal into a high-definition image signal, said method comprising the steps of:

evaluating frequency characteristics of the input image signal with respect to predetermined unit blocks;

setting a pixel pattern from the input image signal with respect to each of the unit blocks;

forming a class code representing a class to which the input image signal forming the pixel pattern belongs by setting a quantization condition with respect to the input image signal according to the evaluated frequency characteristic and data compressing the input image signal; and converting the input image signal into a high-definition image signal by reading out previously-obtained prediction data stored for each class in a memory according to the class code and using the prediction data as pixels of the high-definition image signa.

20. A signal conversion method for converting a low-definition input image signal into a high-definition image signal, said method comprising the steps of:

evaluating frequency characteristics of the input image signal with respect to predetermined unit blocks;

setting a class by selecting a pixel pattern according to the evaluated frequency characteristic;

forming a class code representing a class to which the input image signal forming the selected pixel pattern belongs by setting a quantization condition with respect to the input image signal according to the evaluated frequency characteristic and data compressing the input image signa; and converting the input image signal into a high-definition image signal by reading out previously-obtained prediction data stored for each class in a memory according to the class and the class code and using the prediction data as interpolated pixels of the input image signal.

21. An apparatus for converting a first image signal formed of pixels into a second image signal formed of pixels and having a resolution greater than the first image signal, said apparatus comprising:

means for detecting a frequency characteristic with respect to pixels in the first image signal in a vicinity close to a target pixel of the second image signal;

means for selecting pixels in said vicinity in said first image signal as a function of the detected frequency characteristic for determining a class in accordance with the selected pixels;

a memory for storing a respective set of predicted coefficients for each class, each set of predicted coefficients having been generated using a training image signal corresponding to said second image signal;

means for retrieving a set of predicted coefficients from said memory in response to the determined class; and means for generating the target pixel of the second image signal in accordance with the retrieved set of predicted coefficients and pixels in the first image signal in a vicinity close to the target pixel.

22. The apparatus according to claim 21, wherein all pixels of the second image signal are formed of target pixels derived from the first image signal.

23. The apparatus according to claim 21, wherein each set of predicted coefficients is generated by a least squares technique; and wherein said generating means calculates a linear combination of said pixels of the first image signal in said vicinity close to the target pixel and the retrieved set of predicted coefficients to generate the target pixel.

24. The apparatus according to claim 21, wherein said set of predicted coefficients stored in said memory are generated by:

receiving a first training image signal corresponding to the first image signal and a second training image signal corresponding to the second image signal;

detecting a frequency characteristic with respect to pixels in the first training image signal corresponding to those pixels in said vicinity in said first image signal;

selecting pixels from said corresponding pixels in said first training image signal as a function of the detected frequency characteristic of said corresponding pixels for determining a class in accordance with the selected pixels; and determining the set of predicted coefficients for each class by using the first and second training images.

25. Apparatus for converting a first image signal into a second image signal having a resolution greater than the first image signal, said apparatus comprising:

means for detecting a frequency characteristic with respect to pixels in the first image signal in a vicinity of a target pixel of the second image signal;

means for selecting pixels in said vicinity in said first image signal for determining a class in accordance with the selected pixels and in response to the detected frequency characteristics;

a memory for storing a respective predicted value for each class, each predicted value having been generated using a training image signal corresponding to said second image signal; and means for retrieving a predicted value from said memory in response to the determined class to output the predicted value as the target pixel of the second image.

26. The apparatus according to claim 25 wherein all pixels of the second image signal are derived from the first image signal.

27. The apparatus according to claim 25, wherein the predicted value stored in said memory for each class is predetermined by:

receiving a first training image signal corresponding to the first image signal and a second training image signal corresponding to the second image signal;

detecting a frequency characteristic with respect to pixels in the first training image signal in the vicinity of a target pixel in the second image signal;

selecting pixels from said first training image signal as a function of the detected frequency characteristic to determine a class in accordance with the selected pixels; and determining the predicted value for each class by using the first and second training images.

28. A method for converting a first image signal formed of pixels into a second image signal formed of pixels and having resolution greater than the first image signal, said method comprising the steps of:

detecting a frequency characteristic with respect to pixels in the first image signal in a vicinity close to a target pixel of the second image signal;

selecting pixels in said vicinity in said first image signal as a function of the detected frequency characteristic for determining a class in accordance with the selected pixels;

retrieving a set of predicted coefficients stored in a memory in response to the determined class, each stored set of predicted coefficients having been generated using a training image signal corresponding to said second image signal; and generating the target pixel of the second image signal in accordance with the retrieved set of predicted coefficients and pixels in the first image signal in a vicinity close to the target pixel.

29. The method according to claim 28, wherein all pixels of the second image signal are formed of target pixels derived from the first image signal.

30. The method according to claim 28, wherein each set of predicted coefficients is generated by a least squares technique, and a linear combination of said pixels of the first image signal in said vicinity close to said target pixel and the retrieved set of predicted coefficients is calculated to generate the target pixel.

31. The method according to claim 28, wherein said predicted coefficients stored in said memory are generated by:

receiving a first training image signal corresponding to the first image signal and a second training image signal corresponding to the second image signal;

detecting a frequency characteristic with respect to pixels in the first training image signal corresponding to those pixels in said vicinity in said first image signal;

selecting pixels from said first training image signal as a function of the detected frequency characteristic to determine a class in accordance with the selected pixels; and determining the set of predicted coefficients for each class by using the first and second training images.

32. A method for converting a first image signal into a second image signal having a resolution greater than the first image signal, said method comprising the steps of:

detecting a frequency characteristic with respect to pixels in the first image signal in a vicinity of a target pixel of the second image signal;

selecting pixels in said vicinity in said first image signal as a function of the detected frequency characteristic for determining a class in accordance with the selected pixels; and retrieving a predicted value stored in a memory in response to the determined class, each stored predicted value having been generated using a training image signal corresponding to said second image signal to output the predicted value as the target pixel of the second image.

33. The method according to claim 32, wherein all pixels of the second image signal are formed of target pixels derived from the first image signal.

34. The method according to claim 32, wherein said predicted value stored in said memory for each class is generated by:

receiving a first training image signal corresponding to the first image signal and a second training image signal corresponding to the second image signal;

detecting a frequency characteristic with respect to pixels in the first training image signal in the vicinity of a target pixel in the second image signal;

selecting pixels from said first training image signal as a function of the detected frequency characteristic to determine a class in accordance with the selected pixels; and determining the predicted value for each class by using the first and second training images.

* * * * *